United States Patent
Niu et al.

(10) Patent No.: US 6,268,874 B1
(45) Date of Patent: Jul. 31, 2001

(54) STATE PARSER FOR A MULTI-STAGE GRAPHICS PIPELINE

(75) Inventors: Roger Niu, San Jose; Dong-Ying Kuo, Pleasanton; Randy X. Zhao, Fremont; Chih-Hong Fu, Sunnyvale, all of CA (US)

(73) Assignee: S3 Graphics Co., Ltd. (KY)

( * ) Notice: Subject to any disclaimer, the term of this patent is extended or adjusted under 35 U.S.C. 154(b) by 0 days.

(21) Appl. No.: 09/128,923

(22) Filed: Aug. 4, 1998

(51) Int. Cl.[7] ........................................... G06T 1/20
(52) U.S. Cl. ................ 345/506; 345/519; 345/556; 345/559; 345/561
(58) Field of Search .................. 345/502, 505, 345/506, 522, 523, 524, 519, 514, 513, 559, 561, 556

(56) References Cited

U.S. PATENT DOCUMENTS

| | | | |
|---|---|---|---|
| 5,010,515 | * 4/1991 | Torborg, Jr. | 345/505 |
| 5,325,493 | * 6/1994 | Herrell et al. | 712/201 |
| 5,337,410 | * 8/1994 | Appel | 345/501 |
| 5,485,559 | * 1/1996 | Sakaibara et al. | 345/433 |
| 5,838,383 | * 11/1998 | Chimoto et al. | 348/553 |

\* cited by examiner

Primary Examiner—Kee M. Tung

(74) Attorney, Agent, or Firm—Carr & Ferrell LLP (57) ABSTRACT

A command parser 308 is coupled to an incoming data stream to insert an end of state token at the end of a group of state data 480 and an end of primitive token at the end of a group of primitive data 484 to create a parsed data stream. The parsed state data stream is transmitted to a state controller 420 which loads state data 480 into shadow stages 412. The state controller 420 validates a shadow stage 412 upon receiving an end of state group token. The parsed primitive data 484 are also transmitted to primitive controllers 424. The primitive controllers 424 prevent primitive data from being transmitted into a processing element 464 responsive to receiving an end of primitive_B token. Upon receiving an end of primitive_E token, the primitive controller 424 ascertains whether the first shadow stage 412 has been validated. If it has, the primitive controller 424 loads the state data 480 into the working stage 406, and allows the primitive data 484 to be transmitted to the processing element 464, where it is processed in accordance with the state data 480 in the working stage 406. In an alternate embodiment, a dirty bit 415 is used to indicate that the state data 480 received by the state controller 420 is identical to previously received state data 480. The primitive controller 424 ascertains whether the dirty bit 415 of the first shadow stage 412 associated with its processing element 464 is marked. If the dirty bit 415 is unmarked, the primitive controller 424 allows the primitive data 484 to be processed by the processing element 464 without delay in accordance with the existing state information in the working registers.

18 Claims, 6 Drawing Sheets

STATE PARSER FOR A MULTI-STAGE GRAPHICS PIPELINE

TECHNICAL FIELD

This invention pertains to the field of graphics processing and more specifically, to process primitives in a pipeline graphics processing system.

BACKGROUND ART

Graphics processing is the most processor-intensive and memory-consuming component of the computer system. Thus, the industry is constantly searching for ways to optimize graphics processing in order to produce the high-quality images users have come to expect at an affordable price.

Data to be processed by modern graphics processors may be manipulated in many different ways, depending on resources and the desired image quality. For example, textures may be generated by processing data using a bi-linear filter which calculates a weighted average for each pixel from four texels adjacent to the point in a texture that most closely maps to the pixel. Or, the data may be processed using a tri-linear filter which uses mipmap levels just less and greater in resolution to the pixel, and also uses the four texels in each level that most closely map to the pixel. There are many different states under which data may be processed. It is often necessary to use different states to process different data even in a single refresh cycle. Some data comprising pixels or primitives intended for display on a screen may require one state and some may require a second or third state. For example, for a dithering process, a series of primitives may be processed using a first dithering algorithm, and a next series of primitives may be processed using a different dithering algorithm. Or, for filtering, a first primitive may require tri-linear filtering, but a next primitive may only need point sampling. Thus, in addition to the complicated arithmetic operations required to be performed on graphics data, the graphics processor designer must provide the capability to perform these operations in accordance with a specific state. This entails keeping track of an associated state for each primitive to be processed.

Figure 1A:
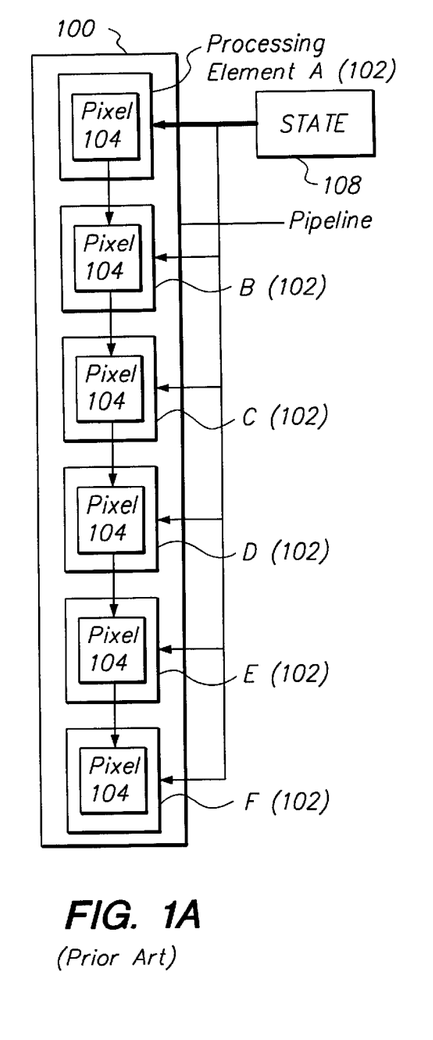
FIG. 1a illustrates a first prior art graphics primitive processing configuration.

A first example of a system of tracking and applying the state of a primitive is displayed in Figure 1a. In this system, the state data 108 to be applied to all primitives are stored in a register which is accessed by the processing elements 102 upon processing primitive data 104. The primitive data 104 is transmitted through a pipeline 100 through the various processing elements 102. This system saves on cost; however, if the state changes between a first and second primitive, the system must wait for the pipeline 100 to flush all data relating to the first primitive before applying the new state to the second primitive. This causes delays in processing and display which may be unacceptable to the user.

Figure 1B:
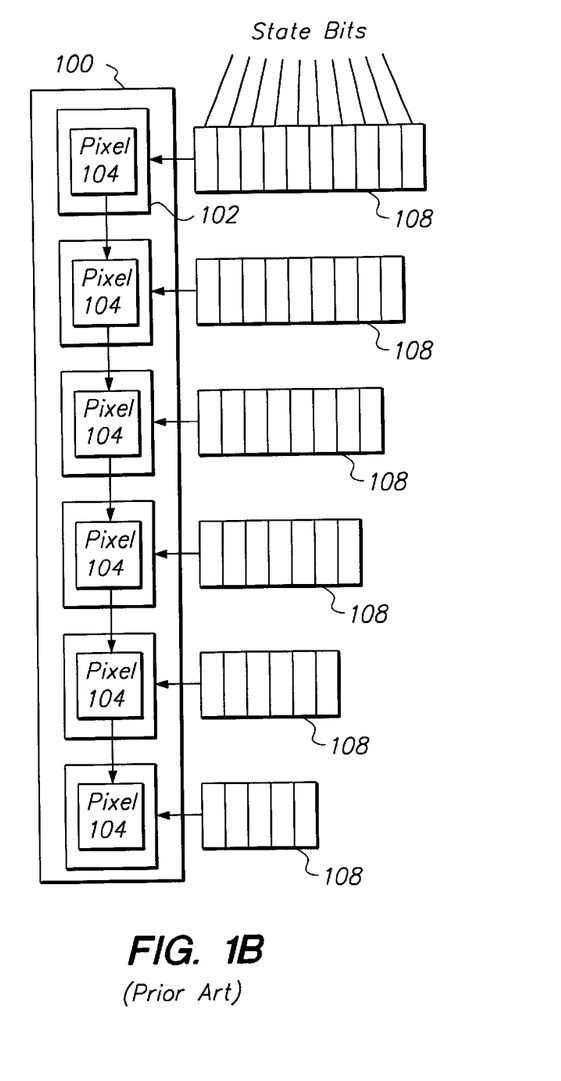
FIG. 1b illustrates a second prior art graphics primitive processing configuration.

A second example of a system of tracking and applying the state of a primitive is displayed in Figure 1b. In this system, the state data 108 is transmitted along with each primitive 104. Thus, in this embodiment, if the state changes between two primitives 104, the second primitive 104 can be immediately operated upon in accordance with the new state 108. However, this configuration requires more hardware to store the state data 108 associated with each primitive 104 and is very expensive in implementation.

Thus, a system is needed for processing graphics data which can respond quickly to state changes while minimizing the use of additional hardware.

SUMMARY OF THE INVENTION

In accordance with the present invention, a parser is coupled to an incoming data stream to insert an end of state token at the end of a group of state data and an end of primitive token at the end of a group of primitive data to create a parsed data stream. The parsed state stream is transmitted to a state controller which loads state data into shadow stages. The state controller validates a shadow stage upon receiving an end of state group token which signifies that the entire group of state information has been loaded into the shadow stage. The parsed primitive data is transmitted to primitive controllers, which are coupled together serially. The primitive controllers load the data into working registers in response to receiving an end of primitive group token and verifying that the valid bit for the shadow stage has been set. The primitive is then processed in accordance with the loaded state.

In a preferred embodiment, the primitive controllers prevent primitive data from being transmitted into a processing element responsive to receiving an end of primitive_B (Begin) token. Upon receiving an end of primitive_E (End) token, the primitive controller ascertains whether the first shadow stage has been validated. If it has, the primitive controller loads the state data in the first shadow stage into the working stage, and allows the primitive data to be transmitted to the processing element, where it is processed in accordance with the state information in the working stage. Thus, state changes may be implemented on a primitive by primitive basis without unnecessary delay. In a preferred embodiment, there are multiple processing elements and primitive controllers associated with each processing element. In another preferred embodiment, there are multiple processing stages, and state controllers associated with each processing stage.

In an alternate embodiment, a dirty bit is used to indicate whether the state information received by the state controller is identical to previously received state information. When a state controller identifies that the state has changed from a first state to a second state, the state controller marks the dirty bit associated with the shadow stage having the changed state information. When the primitive controller receives an end of primitive_B token, the primitive controller ascertains whether the dirty bit of the first shadow stage associated with its processing element is marked or unmarked. If the dirty bit is unmarked, the primitive controller does not prevent the primitive data from being transmitted to the processing element and the primitive is processed without delay in accordance with the existing state information in the working registers. If the dirty bit is marked, the primitive controller prevents the primitive data from being transmitted until an end of primitive_E token is received, and the primitive controller verifies that the first shadow stage is validated indicating that the changed state information has been loaded into the registers. This embodiment provides faster processing of primitives since primitives having identical states are processed without delay. Additionally, this embodiment advantageously allows the use of a minimal amount of shadow stages, thus eliminating much of the additional hardware required to track state information. However, state information is still tracked for each primitive data, thus allowing for greater flexibility in changing states for different primitives and minimizing the latency of the pipeline.

DETAILED DESCRIPTION OF THE PREFERRED EMBODIMENTS

Figure 2:
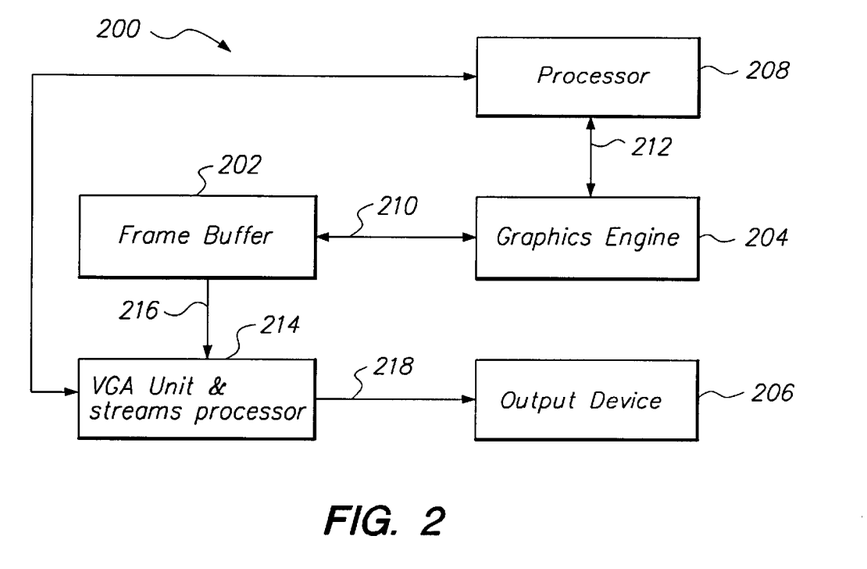
FIG. 2 illustrates a computer system 200 in accordance with the present invention.

FIG. 2 illustrates a block diagram of a system 200 including a preferred embodiment of the present invention is shown. The system 200 preferably comprises a frame buffer 202, a graphics engine 204, an output device 206, a processor 208, and a VGA (Video Graphics Adapter) unit 214. The system 200 may also include main memory, an input device, a data storage device and a network interface, although not shown. The processor 208 is coupled to the graphics engine 204 and the frame buffer 202 in a conventional manner. The processor 208 is preferably a microprocessor such as an Intel Pentium; the output device 206 is preferably a video monitor; and the frame buffer 202 is preferably random access memory (RAM). The graphics engine or accelerator 204 includes conventional functionality including 2D graphics processing, 3D graphics processing, and video image processing, such as in the ViRGE integrated 3D accelerator manufactured and sold by S3 Incorporated of Santa Clara, Calif. As shown, the graphics engine 204 is coupled via line 210 to the frame buffer 202 for sending and receiving data to be rendered on the output device 206. The graphics engine 204 is also coupled by line 212 to the processor 208 to receive data and commands for rendering images on the output device 206. The frame buffer 202 is also coupled by the VGA unit 214 and lines 216, 218 to the output device 206. The VGA unit 214 is of a conventional type and performs conventional VGA functions performed ViRGE integrated 3D accelerator manufactured and sold by S 3Incorporated of Santa Clara, Calif., for example.

Figure 3:
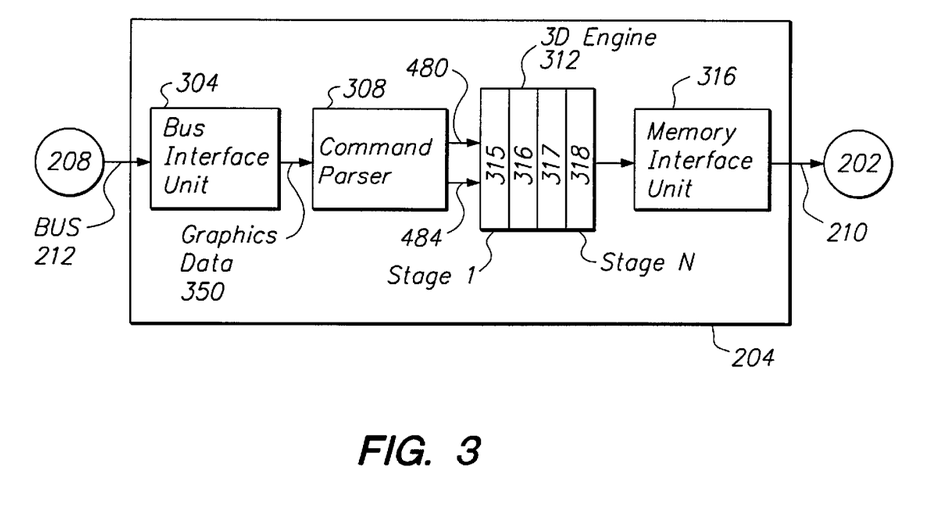
FIG. 3 is a block diagram illustrating the top-level components of a graphics primitive processor.

FIG. 3 illustrates the top-level components and processing of a graphics engine 204 in accordance with the present invention. Graphics data are transmitted on a bus 212 to the graphics engine 204. The bus 212 is preferably a conventional AGP/PCI bus. The graphics data are transmitted to a bus interface unit (BIU) 304 which couples graphics engine 204 to the other components of a computer (not shown.) Graphics data are preferably pixel or primitive information retrieved from the frame buffer 202. Graphics data are processed in accordance with instructions received from the processor 208. Pixel information are typically in Red Green Blue (RGB) format, however, other pixel data formats may be used in accordance with the present invention.

In a preferred embodiment, the pixel information contain primitive information and state information. Primitive information are information regarding the size and type of primitives that are to be rendered. Primitives include points, lines, polygons, and polyhedra in 2D or 3D. State information denote the type of processing that is to be done on the primitive. Each primitive is processed by a processing element 464, shown in FIG. 4, designed to perform a certain task. The tasks include texturing using filters, dithering, fogging, z-buffering, and other commonly performed 2D or 3D graphics processing. Each of these tasks or processes may have different states which determine how the task is to be performed. For example, a pixel may be textured using a filter, and the filtering may be accomplished under one of three states: point sampling, bi-linear, or tri-linear filtering. The identification of which state a primitive is to be processed under as it reaches the filtering processing element 464 is indicated by the associated state data 480 for that primitive in accordance with the state data 480. Other states that may be used in a graphics engine 208 include, for dithering, specifying a certain dithering algorithm, for z-buffering, selecting one of 8 states (greater than, less than, greater than or equal to, etc.) For fogging, the state for a primitive may indicate it is to be processed linearly or non-linearly. The states for different primitives may change. For example, a first primitive may require non-linear fogging, and a next primitive may require linear fogging. Therefore, the state for each primitive must be tracked, in order to correctly process each primitive.

Figure 4:
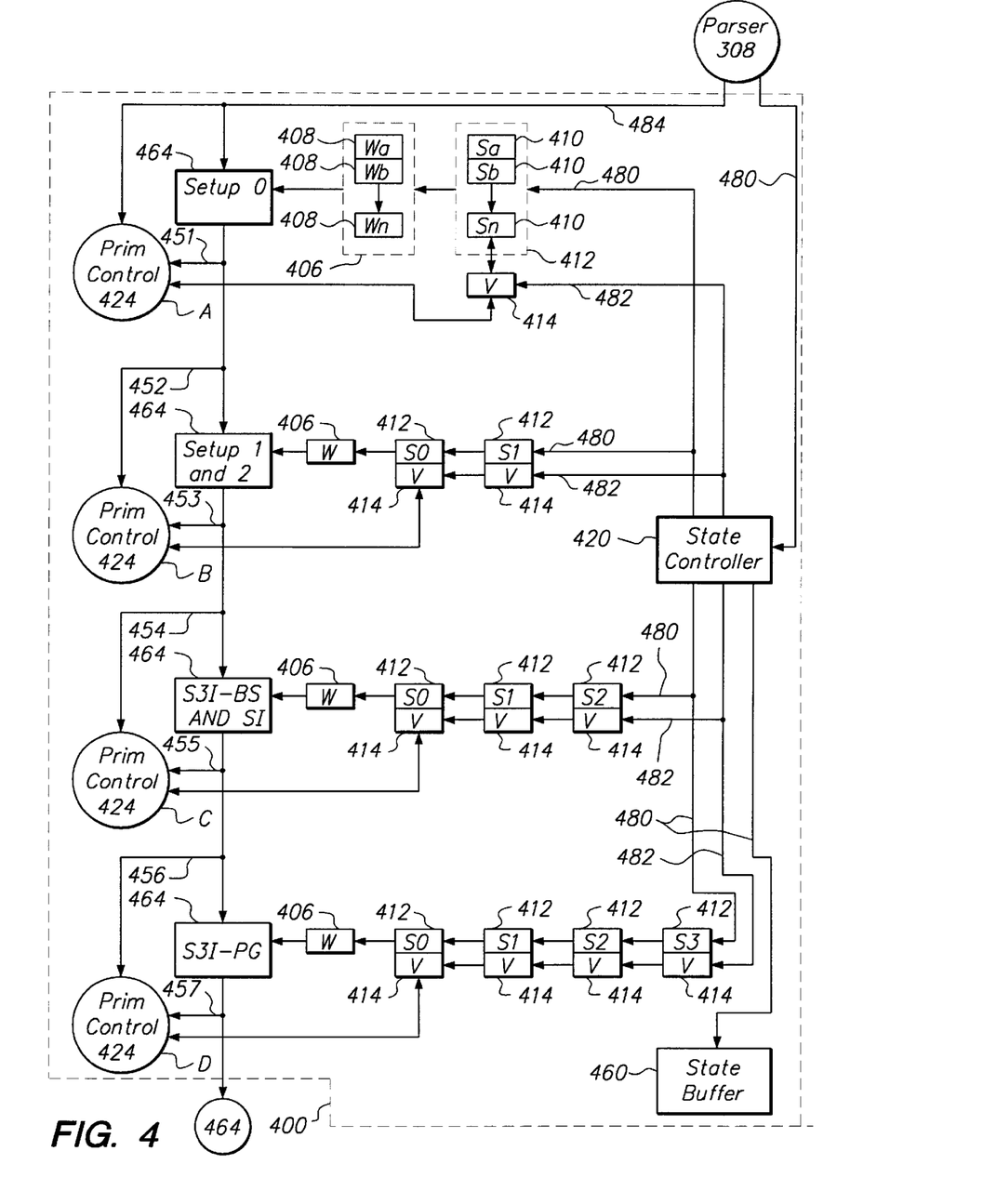
FIG. 4 is a more detailed block diagram illustrating a preferred graphics primitive processor in accordance with the present invention.

The BIU 304 is coupled to a command parser 308. Command parser 308 segments the graphics data 350 into state data 480 and primitive data 484, as shown in FIG. 4. The command parser 308 is preferably a conventional decoding register that decodes the values of the primitive and state data. Segmentation is accomplished by placing an end-of-state (EOS) token after a state group of data, and an end-of-primitive (EOP) token after a primitive group of data. An end of primitive token is preferably a flag at the end of a group of primitive data 484. An end of state token is a marker which is inserted by the parser 308 at the end of a group of state information. Both types of tokens are set upon the parser 308 recognizing the transition between the primitive information and state information in the data stream. The command parser 308 looks for an address bit unique to primitive or state data 480 in determining a transition from primitive data 484 to state data 480 or state data 480 to primitive data 484.

After the command parser 308 has parsed the graphics data 480, the parsed graphics data is transmitted to the 3D engine 312. The parsed data stream is now in two streams; a state data stream 480 and a primitive data stream 484. A group of state data 480 may contain a number of distinct quantities of data, where each quantity is addressed to a processing element 464 within a processing stage, as described above. For example, for the filtering processing element 464, a quantity of state data 480 indicating whether the primitive is to be processed bi-linearly, tri-linearly, or using point sampling is addressed to the filtering processing element 464. The 3D engine 312 contains a plurality of processing elements 464 which process the primitives in accordance with their design. Processing elements 464 are conventional processing units or custom hardware units. Typical processing elements 464 are designed to perform vector and matrix calculations on the primitives to perform fogging, z-buffering, lighting, clipping, transformation, division and mapping to 3D viewpoint operations on the primitives. By way of example, in a group of state data 480, eight quantities of data are transmitted, with three quantities addressed for one processing element 464, two for a second, two for a third, and one for a fourth. The different processing in a graphics engine 204 is typically separated into different processing stages 315, 316, 317, 318. These stages are used to logically separate processing elements 464 which perform related functions.

FIG. 4 illustrates an embodiment of graphics engine 204 where the first processing stage 315 in the 3D engine 312 is the setup unit 400. The setup unit 400 receives commands and data from the processor 208 and stores them for use by the other components of the 3D graphics engine 312. More specifically, the setup unit 400 stores data per triangle (or other primitives) that indicate the size, shade, shape, blending and other rendering information that preferably apply to all processing stages within an engine 204. The setup unit 400 also performs operations on the primitive data 484 as well, such as detecting vertices of the triangles and determining the slopes of the edges of the triangles. Again, the following description relates to a setup unit 400 of a graphics engine 204, however, the principles of the present invention apply to any type of processing stage; and preferably apply to all processing stages within an engine 204.

As illustrated in FIG. 4, each processing element 464 in the setup unit 400 is coupled to a set of state registers 406 and the parsed primitive data 484. The state controller 420 in the first processing stage 315 is also coupled to the command parser 308. In subsequent stages, the state controller 420 is coupled to a buffer 460. The state controller 420 receives the parsed state data 480 from the parser 308 or buffer 460 and determines the processing stage and processing element 464 specified by the address in the data 480. If the processing stage addressed is the set up stage 400, the state data 480 is transmitted to an available shadow stage 412 corresponding to the processing element 464 within the set up stage 400 to which the data 480 refers. If the state data 480 are addressed to a different processing stage, the state data 480 are transmitted to the state FIFO 460 for application to the later processing stages.

Shadow stages 412 comprise registers 410 for holding state data 480. The registers 408 directly coupled to the processing elements 464 are the working registers 408, which form the working stage 406. The working stage 406 stores the state data 480 which is applied to the primitive data 484 currently being processed by the processing element 464 coupled to the working stage 406. The shadow stages 412 store in shadow registers 410 the state data 480 to be applied to subsequent groups of primitive data 484. In a 32 bit system, each register holds 32 bits of information. The number of registers 410 required for each working and shadow stage 406, 412 is dependent upon the processing being performed. For example, some processing elements 464 require state bits to specify flat shade, perspective, D3D_Wrap, texture size, and color format, others require state bits for culling mode, chunk limit, and scissoring, and, as described above, state bits are required for some processing elements 464 to indicate dithering algorithms or non-linear or linear fogging processing. Some processing elements 464 do not require any state bits. Thus, there must be enough registers in each shadow stage 412 to store the state data 480 for each processing element 464. The specific states or processing elements 464 are not critical to the performance of the present invention and are only listed for illustrative purposes. However, having a greater number of processing elements 464 increases the benefits provided in accordance with the present invention.

Upon receiving an EOS token, the state controller 420 validates the state data 480 which has just loaded into the shadow registers 410. Validation is preferably accomplished by setting a valid bit 414 associated with each shadow stage 412 high. Validation in response to receiving an EOS token ensures that the state data 480 required to process a primitive has been entirely transmitted to the shadow stage 412.

A first primitive controller 424 receives primitive data 484 from the command parser 308. Preferably, there is a primitive controller 424 coupled to each processing element 464 and to each other in a serial configuration. Each primitive controller 424 is coupled to the parsed data stream 484 prior to each processing element 464 and after each processing element 464 to receive an EOP_B (end of primitive_beginning) and EOP_E (end of primitive_end) token respectively. An EOP_B token is an end of primitive token (EOP) which is encountered by a primitive controller 424 prior to a processing element 464. This is distinguished from an EOP_E token which is the end of primitive (EOP) token received by the primitive controller 424 after a processing element 464. For example, if primitive controller B receives an EOP token through data line 452 coupled above processing element B, the EOP token is treated as an EOP_B. After the primitive is processed through processing element B, the EOP token is received again by primitive controller B through data line 453; however, this time, the end of primitive token is treated as an EOP_E token.

Upon receiving an EOP_B token, a controller 424 prevents the subsequent primitive data 484 from being transmitted to the processing element 464 associated with the controller 424. Upon receiving an EOP_E token, which indicates that the current primitive has been flushed out of the pipeline 100, the controller 424 examines the valid bit 414 of the first shadow stage 412 corresponding to the associated processing element 464. If the bit has been validated, the state data 480 in the validated shadow stage 412 are loaded into the working stage 406 to be applied to the primitive data 484. Thus, only upon receiving the EOS token are state data 480 validated, and only upon receiving an EOP_E token are the validated state data 480 loaded into the working registers 408. Therefore, a one-to-one correspondence between the state data 480 and primitive data 484 is maintained throughout the primitive processing, providing flexibility in allowing state changes to be made for consecutive primitives in the pipeline 100 without waiting for the entire pipeline 100 to be flushed. In a preferred embodiment, the state controller 420, primitive controller 424, processing elements 464, and parser 308 are all located on a single integrated circuit.

The depth of the shadow stages 412 for each processing element 464 in a processing stage changes incrementally. For the first processing element 464 in a processing stage, the depth is assigned to be one. Then, the depth for the next processing element 464 is incremented by one, and so on. The depth needs to increase because the data 480 within the shadow stage 412 for the first processing element 464 is applied to the first primitive almost immediately, and therefore there does not need to be any state data 480 stored in subsequent shadow stages 412. However, for the second processing element 464, a shadow stage 412 must be added in order to be able to store the state data 480 for the first primitive data 484 group while it is being processed by the first processing element 464, and the state data 480 for the second primitive group as it is transmitted down the state data stream 480. It cannot use the shadow stage 412 storing the data 480 for the first primitive because the first primitive has not been processed by the first processing element 464 yet. This pattern increases with the number of processing elements 464, so that if there are N processing elements 464, there must be N+1 shadow stages 412 and corresponding valid bits 414 for the processing elements 464.

Figure 5:
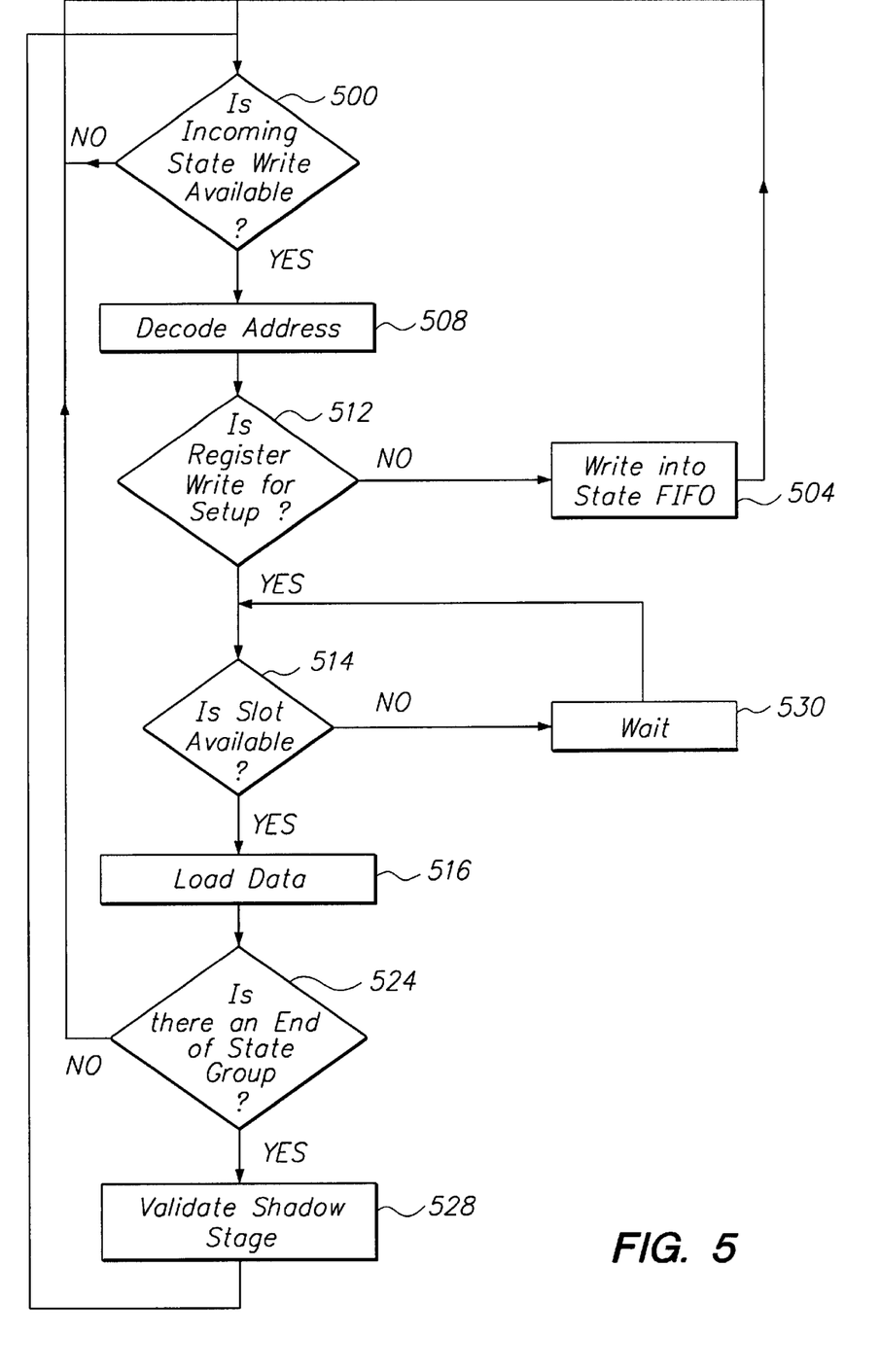
FIG. 5 illustrates the processing of a preferred state controller in accordance with the embodiment of FIG. 4.

FIG. 5 illustrates operation of a preferred embodiment of the state controller 420 for the setup unit 400. The state controller 420 determines 500 if an incoming state write is available. If the incoming state write is not available, then the system waits until an incoming write is available. If an incoming state write is available, the address for the state write is decoded 508. The controller 420 determines 512 whether the register write is for the setup unit 400. If the register write is not for the setup unit 400, the data is loaded 504 into a buffer 460 where it is subsequently processed on a first-in, first-out basis for the subsequent processing stages, and the state controller returns to step 500. If the register write is for the setup unit 400, the controller 420 determines 514 whether there is space available in the shadow stages 412 to receive the new state information 480. If there is not, the controller 420 waits 530 until a slot opens, and the pipeline 100 stalls. If there is, the data is loaded 516 into the addressed registers 410. The state controller 420 then determines 524 whether there is an end of state group token. If there is, the controller 420 validates 528 the shadow stages 412, as described above, and returns to step 500. If there is no end of state group token, the shadow stage 412 is not validated.

Figure 6:
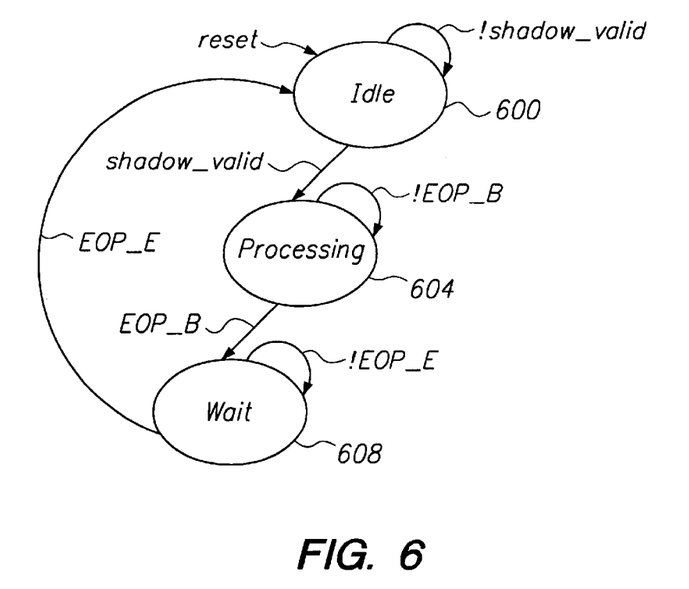
FIG. 6 illustrates the processing of a preferred primitive controller in accordance with the embodiment of FIG. 4.

FIG. 6 illustrates a state machine depicting the processing of the primitive controllers 424. A reset puts the primitive controllers 424 into the idle state 600. A reset typically occurs at start-up of the system. Once in the idle state 600, controller 424 waits until the first shadow stage 412 is validated by the state controller 420. When the first shadow stage 412 is valid, the controller 424 moves into the processing stage 604. In the processing stage, the controller 424 loads the data in the first shadow stage 412 to the working stage 406 where it is applied to the primitive in the processing element 464 associated with the primitive controller 424. The first shadow stage 412 is the shadow stage 412 coupled directly to the working stage 406.

Once in the processing state 604, the primitive controller 424 waits for an EOP_B token. Once an EOP_B token is received, indicating that the new primitive group is about to be transmitted to a processing element 464, the controller 424 moves into the wait state 608 and blocks the flow of incoming data until the EOP_E token is received. The EOP_E token indicates that the previous primitive has been completely processed by the processing element 460 using the state information 480 in the working stage 406. Upon receiving an EOP_E, the controller 424 moves into the idle state 600 and checks the shadow stage 412 to see if it has been validated. If it has, the controller 424 switches back to the processing state 604, and loads the new state information 480 to the working stage 406.

Figure 7:
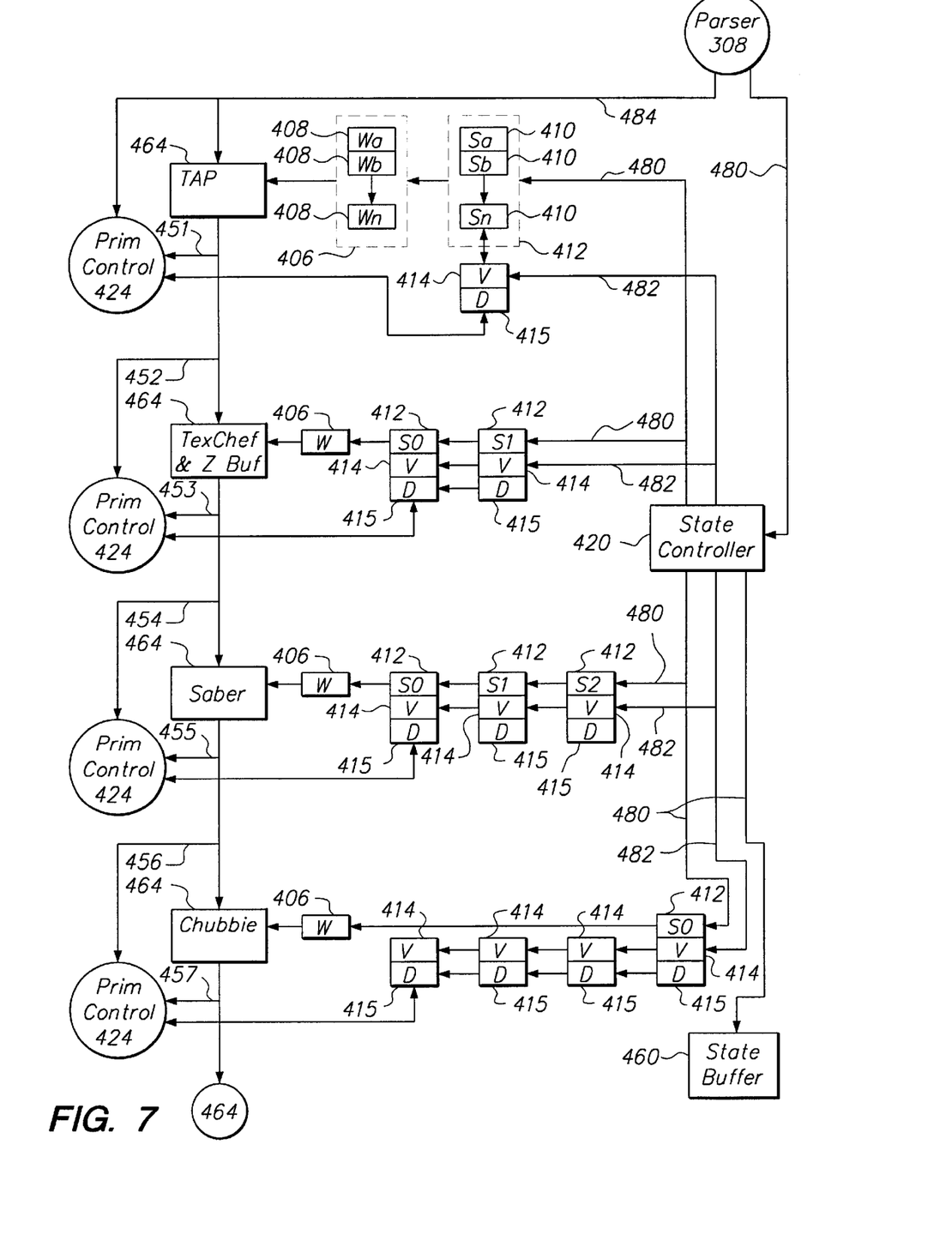
FIG. 7 illustrates a preferred graphics primitive processor in an embodiment of the present invention using dirty bits.

FIG. 7 illustrates the processing of the embodiment of the present invention wherein primitive data 484 is processed using dirty bits 415. The processing elements 464 shown are the TAP, TexChef, Z, Saber, and Chubbie processing stages conventionally employed by graphics engines. A dirty bit 415 is coupled to each shadow stage 412. A dirty bit 415 is used to identify whether the state for a current primitive has changed from the previous primitive. The use of the dirty bit 415 advantageously allows the use of a smaller number of shadow stages 412 and faster processing of primitives. In order to track every state, there must be N+1 stages 412 for each processing element 464, as described above. However, for some processing elements 464 the state rarely charges. Thus, for those processing elements 464, less shadow stages 412 are used. For example, the Chubbie processing element 464 shown in FIG. 7 rarely has state changes. Therefore only one shadow stage 412 is allocated for it. This eliminates 3 shadow stages 412, which results in at least 96 bits of savings. Upon receiving a new state, the state controller 420 determines whether the one shadow stage 412 associated with the Chubbie processing element 464 is available. If it is not, the pipeline 100 stalls until all of the primitives have been processed corresponding to the states represented by the dirty bits 415 and the one shadow stage 412. Once the shadow stage 412 is available, the new state is loaded and the pipeline 100 begins transmitting new primitive information again.

As shown in FIG. 7, the state controller 420 is coupled to the command parser 308 and receives state information. The state controller 420 determines whether the received state information 480 is identical to the state information 480 in the most recently filled shadow stage 412. If the state information 480 is identical, the valid bit 414 is set, and the dirty bit 415 is left unmarked. When the state information in the first shadow stages 412 is loaded into the working stage 406, the state information in the subsequent stages are transferred over to the next available shadow stage 412. If a shadow stage 412 has a dirty bit 415 marked, upon transfer to a new shadow or stage the dirty bit 415 for the new stage is marked.

Figure 8:
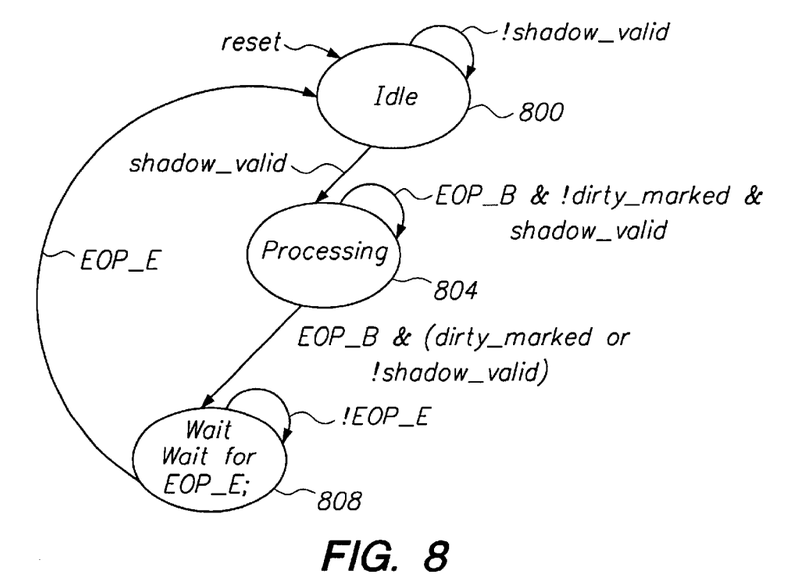
FIG. 8 illustrates the processing of a preferred primitive controller in the embodiment of FIG. 7.

FIG. 8 illustrates the processing of the primitive controllers 424 in this embodiment. Initially, after a reset, the primitive controllers 424 are in the idle state 800. Upon detecting a valid bit for the first shadow stage 412, primitive controller 424 moves into the processing state 804. Once in the processing state 804, the primitive controller 424 loads the state information 480 on the shadow stage 412 into the working stage 406 to be applied to the primitive data 484. Then, the controller 424 waits to receive an EOP_B token. Receipt of this token, as described above, indicates that the data comprising a primitive which is being processed by the corresponding processing element 464 of the primitive controller 424 is about to end. Thus, the primitive controller 424 must determine under what state to process the next primitive. The controller 424 examines the dirty bit 415 to determine whether the state for the next primitive is the same as the state used by the currently processing primitive. If the dirty bit 415 is not marked, then the primitive controller 424 knows that the two states are identical, and returns to the processing state 804 after ascertaining the shadow stage is valid, and the next primitive is processed in accordance with the state which is currently in the working state 406.

If the dirty bit 415 is marked, which indicates that the state for the next primitive is different then the state for the current primitive, the primitive controller 424 blocks incoming pixels from being transmitted into the processing element 464. After receiving an EOP_E token, which means that the current operating primitive has been flushed out of the processing element, the controller 424 then moves to the Idle state 800 and waits for the first shadow register to be validated. When the shadow register is validated, the primitive controller 424 shifts into the processing state 804, and the new state is loaded into the working registers and the next primitive is processed. By waiting for the previous primitive to be flushed before loading the new state, the controller ensures that the primitives are only processed in accordance with their correct state.

Thus, the one-to-one correspondence between the state and primitive data is maintained, while allowing flexible and efficient processing of primitives using different states. The benefits are maximized as the pipeline 100 becomes deeper. The engine 204 does not have to wait for long sections of pipeline 100 to flush prior to changing the state, and accomplishes this goal while using a minimal amount of extra hardware. However, by using the dirty bit 415, for the majority of the processing, the controller 424 will not have to wait for the pipeline 100 to flush before applying the state data 480. This greatly optimizes the processing time of the engine 204.

What is claimed is:

1. An apparatus for optimizing graphics processing, in a system having multiple states in which primitive data is processed and wherein primitive data and state data are transmitted by a data source in a single stream to be processed, the primitive data comprising groups of primitive data and the state data comprising groups of state data, comprising:
   a parser, for inserting a token at an end of each state and primitive group and transmitting a parsed data stream;
   a state controller, coupled to the parser, for loading a state group into state registers and setting a valid bit responsive to receiving an end of state group token;
   a primitive controller, coupled to the parser, for loading state data into working registers, in response to receiving an end of data token and a valid bit associated with the state data to be loaded being set; and
   a plurality of processing elements, wherein a first processing element is coupled to the parser, and subsequent processing elements are coupled together serially, for receiving primitive data and state data, for performing pre-defined bit manipulations on the primitive data in response to the state data in the working registers.

2. The apparatus of claim 1 wherein a dirty bit is set by the state controller to indicate whether a state data associated with a group of primitive data has changed from a state data associated with a group of previously received primitive data, and the primitive controllers examine the dirty bit and, responsive to the dirty bit being unmarked, allow a processing element coupled to the primitive controller to perform pre-defined bit-manipulations on the primitive data in response to the previously received state data.

3. The apparatus of claim 1 wherein the processing elements are arithmetic logical units, and the arithmetic logical units perform pre-defined arithmetic operations on the primitive data bits in response to the state data.

4. The apparatus of claim 1 wherein the states indicated by the state data comprise a tri-linear filtering state and a bi-linear filtering state.

5. The apparatus of claim 1 wherein the system has multiple processing stages, the state data has addresses indicating which processing stage the state data is associated with, and the state controller identifies a processing stage associated with a group of state data and transmits the group of state data to the associated processing stage.

6. The apparatus of claim 5 wherein there are state controllers for each processing stage, a state controller determines whether a group of state data is addressed to the processing stage associated with the state controller, and the state controller transmits the group of state data to a buffer responsive to the group of state data being addressed for a processing stage different than the processing stage associated with the state controller.

7. The apparatus of claim 1 wherein the parser, the state controllers, the primitive controllers and the processing elements are located on an integrated circuit.

8. The apparatus of claim 1 further comprising at least one shadow state, wherein a first shadow state is coupled to the working registers and subsequent shadow stages are coupled to each other serially, for storing subsequent groups of state data to be applied to subsequent groups of primitive data.

9. The apparatus of claim 8, wherein there are primitive controllers for each processing element, and the primitive controllers are coupled to the parsed data stream at a point prior to and subsequent from the associated processing element of the primitive controller, and responsive to receiving an end of primitive token from the point prior to the associated processing element, preventing subsequent primitive data from being transmitted into the processing element, and responsive to receiving an end of primitive token from the point subsequent to the associated processing element and verifying that a valid bit is set for the first shadow stage, loading the state data from the first shadow stage into the working registers.

10. The apparatus of claim 9, wherein a dirty bit is coupled to each shadow stage, the state controller marks the dirty bit associated with a shadow stage responsive to a received group of state data not matching the state data stored in the shadow stage, and the primitive controller prevents subsequent primitive data from being transmitted to an associated processing element responsive to receiving an end of primitive token from the point prior to the associated processing element and the dirty bit associated with the first shadow stage being marked.

11. A method for optimizing graphics processing in a system having multiple states in which primitive data is processed and wherein primitive data and state data are transmitted in a single data stream to be processed, the primitive data comprising bytes of primitive data and the state data comprising bytes of state data, comprising the steps of:
   inserting an end of state token at an end of a group of state data;
   inserting an end of primitive token at an end of a group of primitive data;
   separating the data stream into a state data stream and a primitive data stream in response to finding tokens;
   loading the state data into state registers and setting a valid bit responsive to receiving the end of state token;
   loading the state data into working registers in response to receiving the end of primitive token and the valid bit being set; and
   processing primitive data in response to the state data in the working registers.

12. The method of claim 11 wherein the step of loading the state data into state registers and setting a valid bit is performed by a state controller.

13. The method of claim 11 wherein the step of loading the state data into working registers in response to receiving the end of primitive token and the valid bit being set is performed by a primitive controller.

14. The method of claim 11 further comprising the step of transmitting the primitive data into processing elements in response to receiving the end of primitive token.

15. The method of claim 11 further comprising the step of identifying a processing state associated with a group of state data.

16. The method of claim 15 further comprising the step of transmitting the group of state data to a buffer in response to the group of state data being addressed for a processing stage different than the processing stage associated with a state controller.

17. The method of claim 11 further comprising the step of storing subsequent groups of state data to be applied to subsequent groups of primitive data in at least one shadow stage.

18. The method of claim 17 further comprising the step of marking a dirty bit in response to receiving a group of state data not matching the state data stored in the shadow stage.

* * * * *